US006708044B1

(12) United States Patent
Puknat et al.

(10) Patent No.: US 6,708,044 B1
(45) Date of Patent: Mar. 16, 2004

(54) APPARATUS AND METHOD FOR AUTOMATED BAND SELECTION VIA SYNTHESIZER BIT INSERTION

(75) Inventors: William Puknat, Plano, TX (US); Mukesh Patel, Coppell, TX (US); Dongan Zhang, Plano, TX (US)

(73) Assignee: NEC America, Inc., Melville, NY (US)

( * ) Notice: Subject to any disclaimer, the term of this patent is extended or adjusted under 35 U.S.C. 154(b) by 0 days.

(21) Appl. No.: 09/542,188

(22) Filed: Apr. 4, 2000

(51) Int. Cl.[7] .............................................. H04M 1/00
(52) U.S. Cl. .................. 455/552.1; 455/76; 455/550.1; 455/75
(58) Field of Search .............................. 455/76, 73, 75, 455/552.1, 550.1, 180.1, 432.1, 422.1, 464, 436, 437, 553.1, 426.1, 83; 370/337, 321, 335, 342, 347, 442; 375/267, 299, 347

(56) References Cited

U.S. PATENT DOCUMENTS

| | | | | |
|---|---|---|---|---|
| 5,249,302 A | * | 9/1993 | Metroka et al. ......... | 455/552.1 |
| 5,430,416 A | * | 7/1995 | Black et al. ............ | 332/145 |
| 5,761,623 A | * | 6/1998 | Lupien et al. .......... | 455/552.1 |
| 5,815,525 A | * | 9/1998 | Smith et al. ............ | 375/130 |
| 5,963,852 A | * | 10/1999 | Schlang et al. ......... | 455/76 |
| 6,035,191 A | * | 3/2000 | Moore .................... | 455/418 |
| 6,061,575 A | * | 5/2000 | Lombardi ............... | 455/552.1 |
| 6,169,733 B1 | * | 1/2001 | Lee ....................... | 370/342 |
| 6,215,988 B1 | * | 4/2001 | Matero ................... | 455/188.1 |
| 6,415,158 B1 | * | 7/2002 | King et al. ............. | 455/552.1 |
| 6,484,013 B1 | * | 11/2002 | Ishii ...................... | 455/73 |
| 6,535,499 B1 | * | 3/2003 | Futamura et al. ........ | 370/342 |

\* cited by examiner

*Primary Examiner*—Sonny Trinh
(74) *Attorney, Agent, or Firm*—Scully, Scott, Murphy & Presser

(57) ABSTRACT

A method and apparatus for providing time-critical band selection in a communication device with dual band or multi-band switching, or, alternatively, for providing dual mode or multi-mode time critical operating ability. The mobile station typically has a transmitter section and a receiver section each capable of dual modes of operation, a frequency synthesizer and a controller. The band to band operating method utilizes a frequency command data signal where data derived from the signal is used in a determinable bit stream of data including a frequency data word. The frequency data word is used for defining an operational state of the synthesizer frequency thereby implementing the transceiver's operating channel. At least one bit (or functional bits) from within the bit stream or received signal is used for defining, at least momentarily, the transceiver's "new" operating band (or state). The functional bits can also be used to effectuate other time critical operations of the mobile station, including band to band switching operations (such as MAHO) over two distinct frequency bands; or, one or more can be used to switch or enable control circuits or functions or operations which are time limited or time constrained or which implicate time critical operations of the communication device or apparatus.

42 Claims, 10 Drawing Sheets

APPARATUS AND METHOD FOR AUTOMATED BAND SELECTION VIA SYNTHESIZER BIT INSERTION

FIELD OF THE INVENTION

The present invention relates generally to the field of signal transmission in radio telephony and remote functional or operational control of a radio device. More specifically, the present invention relates to an apparatus and method for facilitating time-critical frequency band selection within radiotelephone-based communication apparatus operable in more than one frequency band.

BACKGROUND OF THE INVENTION

A conventional cellular network includes spaced-apart, fixed-site base stations. These base stations include transceivers for communicating with mobile stations (MS) or with hand-held phones (HHPs) which are physically present in the geographic area defined by the area covered or cell-site for each particular base station. Each HHP includes one or more transceivers for transmitting and receiving to/from the various or appropriate base stations. During conventional cellular telephone system operation, a mobile station (MS) or an HHP maintains contact with a primary base station when present within the specific geographic area or cell-site "covered" by that particular base station.

As used herein, the terms hand-held phone (HHP), mobile station (MS), and radiotelephone are used interchangeably. As is now well known in the art, traveling mobile stations traverse boundaries into "new" geographic areas (i.e., a "new" cell). Contact is maintained while traversing geographic areas by implementing communication between the MS and the "new" base station (used for maintaining communication with the land based communication system) when the HHP moves into the "new" cell or geographic area. This is often referred to as "handing-off" the phone from one base station to another. Handing-off oftentimes requires transfer to a channel comprising a different frequency within the frequency band because of the inherent construction of cellular systems.

FIG. 1 is a typical cell diagram defining a cellular configuration for a conventional cellular telephone network 100. Cellular network 100 operates in accordance with one of a number of known air interface types, including, for example, time division multiple access (TDMA) protocol. In a TDMA system, for example, each cell within the cellular network operates with an assigned set of transmit and receive frequencies selected from one or more of the available frequency bands. Presently, each set contains multiple paired transmit and/or receive frequencies, typically referred to as channels, and which operate on different frequencies for adjacent cells. The cellular network 100 as shown in FIG. 1 supports operation in both the cellular (approximately 800–900 MHz) band and personal communication service (PCS) band (approximately 1.9–2.0 GHz).

Cellular network 100 includes a base station (BS) 14(1)–(15) within each cell 12(1)–(15). The base stations 14 engage in simultaneous communications with a plurality of mobile stations (MS's, radiotelephones, HHP's, carphones, handsets, etc.) 16 operating roughly within the area of coverage associated with a particular cell 12. At least one control channel is assigned to each base station 14 and is used to carry system radio frequency (RF) control signals between the base stations 14 and the HHPs 16 operating within the base station's area of coverage. These control channels also assist the network with mobile station cell re-selection. Mobile switching centers (MSC) 18 are connected with each other and connected with the public switched telephone network (PSTN) 20, and communicate using control signals and voice/data signals to selectively connect subscriber voice and data communications to the mobile stations 16 through the base stations 14. MSC's are also used in handing-off subscriber communications from a traffic channel of one cell 12 to a traffic channel of another cell as the mobile station 16 roams throughout the cellular service areas (i.e., the network).

For example and referring to FIG. 1, MS 16(1) may be a cellular only device which is traveling through areas covered by base stations 14(2), 14(7), 14(12), and 14(15) on a path from A-to-a. MS 16(1) will communicate with cellular band base station 14(2) while in its area of coverage 12(2). MS 16(1) will be handed off to cellular/PSC band base station 14(7) which will communicate with MS 16(1) in the cellular band since MS 16(1) does not have the capability to communicate on the PCS band. In a similar manner, MS 16(1) will be handed off to cellular band base stations 14(12) and 14(15) when the MS is in their areas of coverage.

MS 16(2) may, for example, be a PCS only device which is traveling through areas covered by base stations 14(1), 14(5), and 14(10), and not communicate with BS 14(14) while on a path from B-to-b. MS 16(2) will communicate with cellular/PCS band base station 14(1) while in its area of coverage 12(1) using the PCS band only. When MS 16(2) moves into the area of coverage 12(5) of base station 14(5), then the MS will be handed off to BS 12(5). In a similar manner, MS 16(2) will be handed off to cellular/PCS band base stations 14(10). However, when MS 16(2) reaches the area of coverage 12(14) of base station 14(14), cellular only base station 14(14) will not be able to provide service, and MS 16(2) will attempt to find service by roaming. When no PCS capable base station is available, this MS 16(2) will typically report "No Service".

Where, for example, MS 16(3) is a dual band device, (e.g., cellular and PCS), then in a similar manner as MS 16(1) and MS 16(2), as MS 16(3) travels on a path from C-to-c, the phone may operate in the cellular band while in the area of coverage 12(13) of base station 14(13), and in either the cellular band or the PCS band when it is in the areas of coverage 12(10), 12(7), and 12(4). In a similar manner, where MS 16(4) is also a dual band device, it may operate in cellular band while in the area of coverage 12(3) of base station 14(3) and may operate in PCS band while in the areas of coverage 12(5) and 12(7) of base stations 14(5) and 14(7). However, as MS 16(4) leaves the area of coverage 12(7), it will have to operate in the cellular band to maintain communications with base station 14(9). Dual MS 16(5), however, would not be required to switch between the cellular band and the PCS band while traveling on a path from E-to-e. In the PCS (only) band mode, MS 16(5) can communicate with base stations 14(1), 14(5), 14(7) and 14(4), while traveling from E-to-e. In the cellular (only) band mode, MS 16(5) can communicate with base stations 14(1) or 14(3), 14(5) or 14(1), 14(2) or 14(5), 14(2) or 14(7), 14(7) or 14(4), and perhaps 14(9) while traveling from E-to-e.

Where MS 16(1), 16(3), 16(4), and 16(5) are present simultaneously in an area of coverage 12(7) such as that controlled by base station 14(7), then it is advantageous to operate certain MS devices in one band while operating other of the MS devices in the other band.

Traditionally, mobile radiotelephones were constructed to operate in either the cellular band or the more recently allocated PCS band networks. For example, hand-held phones were constructed exclusively for a wireline/non-wireline network (cellular band) or PCS network (PCS band). FIG. 2a shows a block diagram of a conventional radio communication (hand held phone) device 200 including a transceiver (FIG. 3 of U.S. Pat. No. 5,430,416, issued Jul. 4, 1995, to Black, and the patent incorporated herein by reference). Device 200 provides the ability for a mobile station (or HHP) to communicate with a base station. In such a device or HHP, communication is carried out, for example, over various radio frequency (RF) channels. Upon receipt of an RF signal transmitted by an HHP present in a cell's geographic area, the base station thereafter typically maintains communication signals with a land-line telephone system (not shown) and/or other HHP's or mobile stations present in the cell area or geographic area.

The mobile station device 200 of FIG. 2a includes an antenna 201, a duplexor 202, a receiver 203, a transmitter 205, a reference frequency signal source 207, a phase locked loop (PLL) frequency synthesizer 208, a processor 210, an information source 206 and an information sink 204. When an RF signal 220 is received at antenna 201 from a base station, it is first filtered by the duplexor 202 to separate the RF received signal at line 211 from any RF transmit signals which may also be present at line 213, using a switch or filter contained therein (not shown in FIG. 2a). The receiver 203 is connected to receive the RF input signal via line 211 and is operative to produce a received baseband signal for transfer via line 212 to information sink 204. Reference frequency signal source 207 provides a reference frequency signal via line 215 to PLL frequency synthesizer 208. The frequency synthesizer also receives information from data bus 218, and operates in response to the data bus data to synthesize transmitter and receiver reference signals and to provide the those signals over lines 216 and/or 217 for use by either receiver 203 and/or transmitter 205.

Processor 210 controls operation of the PLL frequency synthesizer 208, receiver 203 and transmitter 205 via the data bus 218. The information source 206 produces a baseband amplitude modulation (AM) signal and provides it via line 214, as well as a baseband phase modulation (PM) signal via line 221. As mentioned, the transmitter utilizes the source information and the carrier signal to generate an RF transmit signal for transfer to duplexor 202 via line 213. The duplexor connects the RF transmit signal for emission by antenna 201, the transmitted signal referred to hereinafter as RF output signal 220.

As radiotelephone technology has evolved, it has become desirable to include transceivers within hand-held phones which can operate in both the cellular and PCS bands. This is particularly helpful where HHPs operate in areas which allow communication via two (and perhaps more) bands. Such a cellular telecommunication network is disclosed in U.S. Pat. No. 5,761,623, incorporated herein by reference. One complication in such a network, though, is that band-specific components need to be timely switched when necessary to minimize transmission errors and/or requests for retransmission either to or from the HHPs.

Shown in FIG. 2b is another prior art communication device 99. Device 99 includes an antenna 110, a duplexer 120 (or optional triplexer 124), a low noise amplifier (LNA) 124, receive circuitry 125, transmit circuitry 126, a power amplifier (PA) 129, an optional extra band power amplifier 130, a microcontroller 150, a CODEC 160, a speaker 160, and a microphone 180. For dual band operation, duplexor 120 is replaced by triplexer 124, and typically a second PA is used to provide an amplified signal to triplexer 124, as is well known in the art.

Conventional "in" (or intra) band switching is often implemented due to a frequency change request received by the HHP's controller, thereafter affecting the frequency synthesizer and the HHP's transceiver's operation. For band to band (inter) switching, such conventional (intra) band-switching operations can often times be untimely due to the fact that band-specific circuitry is activated only after the frequency change and/or band change information is decoded by the controller. The conventional band to band switching operations may not be timely or may need to be made more time efficient for certain band to band switching operations. For example, each band of a network employing more than one band may require specific physical elements or components such as filters, amplifiers, oscillators, etc. (typically referred to hereinafter as band-specific circuitry), which are for use by the HHP when operating within one particular band. The band-specific circuitry may only be activated or enabled as needed, and typically may require an enablement time from a 'not in use' condition or state to an 'in use' operational condition or state before such circuitry can be reliably or appropriately used.

Presently, it is well known that intra band operating frequency transitions typically occur while the HHP is in communication with one or more base stations. Further, band to band transitions may occur where the HHP is implementing an operational switch or transfer from a first base station to another base station. These band to band transitions may also occur if the HHP has been requested to report various signal strength measurements of another base station's signals as part of the base station to base station transfer or handoff process. Presently, these handoff processes wherein the HHP reports these signal strengths are referred to as Mobile Assisted Hand-Off's (MAHO's). The band to band transitions are likely to occur if the "new" base station has dual cellular and PCS mode capability, and one of the operating bands of the "new" base station is over utilized.

Such band-switching operations have been implemented for one or more of a variety of reasons, such as: 1) implementing an actual first band channel to second band channel hand-off; 2) to enable the HHP to conduct mobile assisted hand-off (MAHO) measurements during conversation mode; or 3) to scan or receive data about a plurality of neighboring base stations, each operating in differing bands, such as cellular and PCS. It should be observed that before the synthesizer can tune to the proper "in-band" frequency, the appropriate band circuitry or components must be effected so that the proper transmission channel is capable of being received from the RF signals. Because band switching is typically a time critical task, an increase in a HHP's ability to timely switch to or between different bands in a system such as TDMA concomitantly increases the network's overall performance.

Therefore it is desirous to implement a transceiver capable of operating within a device or communication system which has an ability to facilitate time-critical and/or more efficient band switching within the transceiver's circuitry or other band specific components. Likewise, such circuitry would be useful as transmitting and receiving circuits of other communication equipment. As an example, it would be useful to implement such a methodology or apparatus in an HHP capable of a first band to second band followed by a second band to the first band switching operation in a more time efficient manner. These band switching and other operations could then preferably be performed during certain periods wherein the network was not intensively communicating with the HHP, thereby permitting additional operations or services to be accessed by the HHP, perhaps without apparent interruption of service to the HHP user. Further, such a methodology or apparatus may become preferred as the operating costs in one particular band may be less or limited with respect to another. It would therefore make it more desirable and cost efficient to operate or receive certain services in a particular band of a system employing two or more bands, provided the HHP is capable of seamlessly switching between the various bands of operation. Further, certain of these services may only be available in one band and not available in other bands. Thus, an ability to timely, efficiently, or seamlessly switch between different bands would effectively render such services available to the HHP and the HHP user, potentially without apparent disabling of the other services provided to the HHP.

SUMMARY AND OBJECTS OF THE INVENTION

It is therefore an object of this invention to provide both a circuit and method for implementing automated band selection which facilitates certain time critical switching operations.

It is another object of this invention to provide both a circuit and method for implementing automated band selection which facilitates efficient band to band switching operations.

It is another object of the invention to provide a transceiver system including reception and transmission circuitry and a method for operating the circuitry which implements automated band selection with improved enabling timing for switching band-specific components or circuitry used within an HHP during critically timed band to band operations, e.g., mobile assisted hand off (MAHO) where the HHP receives a band measurement order for another band.

It is another object of the invention to provide circuitry and a cost effective method for implementing band selection within transceivers which heretofore have not incorporated dual or multiband capability due to cost constraints, thereby providing a cost reduced HHP which is capable of efficient dual band or multiband switching.

It is another object of the invention to provide a system, circuit and/or method for implementing automated band selection with improved band to band switching characteristics of transceivers used in communication systems such as TDMA, CDMA, PHS, PCD or GSM and various other communication systems which implement a transceiver and which must make time critical changes between two operating frequencies wherein the frequencies are located much farther apart than the frequencies of which a conventional frequency synthesizer normally switches between.

It is also an object of the invention to provide a method for selecting a mode of operation of the transceiver such that certain functions or operations within the transceiver are implemented by accessing the incoming data stream to determine at least a portion of an immediate functional or operational state of the transceiver and to direct or control the transceiver accordingly.

The instant invention as related to the preferred embodiment disclosed herein incorporates a method for automated band selection for use in the receive chain architecture of an HHP or like communication apparatus to facilitate time-critical band to band switching. That is, while the communication apparatus is implementing a change of frequency command which may or may not require a band change, it is first determined whether the frequency in use should be switched to a frequency in a different band or frequency set. This permits faster selection or enabling of band-specific circuitry, if needed. This method can also be implemented by preevaluating the frequency command signal by using a microcontroller or digital signal processor (DSP), or both, programmed with an appropriate set of computer instructions or interrupt commands implementing the inventive concepts described herein. The preferred embodiment disclosed herein utilizes a latching circuit to extract or capture a band functional bit or control (or "extra") bit used to identify or select the appropriate band of operation.

Additionally, the invention may employ one or more latch and/or logic circuits in combination which provide one or more operation control signals to the transceiver when implementing a frequency change from a current operating frequency to another frequency or channel in another band. The latch circuit captures one or more bits in the frequency change data bit stream and in combination with the logic circuit generates one or more switching signals therefrom. This automatically enables bandspecific circuitry to be selected for use with the frequency synthesizer during operation in the new band. The latching and/or logic circuit(s) may be implemented by discrete logic elements, as components of an ASIC, or by any other circuitry or combination of circuitry typically relied upon by those skilled in the art of generating and directing high speed signals typically used for enabling or controlling other circuitry.

Further, the functional bit or perhaps up to a plurality of functional bits within the data bit stream can be used for implementing other time critical functions or other less efficient control functions of the transceiver in addition to, or in supplementation to, or in replacement of the band to band switching as described herein. In short, the inventive concepts described herein are not limited to the disclosed band to band switching, but can be implemented for various other operational functions or states of a transceiver or HHP, particularly those functions, operations, or states that are time critical.

Whether implemented by hardware or by software utilized in a controller or DSP or a combination thereof, the functional operation of the invention utilizes a functional bit or "extra" bit included with a data stream or data word which is at least implicitly included within the command data received by the transceiver. The controller is used to evaluate a future operating condition or state of the transceiver and subsequently provides the data stream or data word and/or control signals to circuitry within the transceiver thereby effectuating activation of circuitry used for achieving the condition or state.

The software controlled microprocessor, DSP, and/or the latch circuits receive the command data and extract a frequency data word which is then provided to tune the frequency synthesizer. A functional bit or "extra" bit is concurrently extracted or captured to generate a band select signal which is provided to activate the appropriate band specific circuitry. In the preferred embodiment, the "extra" bit is specifically extracted to form a control signal used to activate the appropriate band-specific elements and circuitry within the receive and transmit chain signal paths. For example, the control signal may control, activate, or effect cellular specific circuits or PCS specific circuits, one set of which were previously in an "off" state before receipt and determination of the switch to a new band command.

Additionally, the invention overcomes the lack within TDMA chipsets of a provision to generate a band switch signal capable of controlling such a time-critical event. That is, conventional TDMA chipsets control the timing of the synthesizer data but provide no ability for time critical PCS/Cellular band switching. The band switching logic disclosed herein may supplement or be included in conventional TDMA chipsets or other chipsets used for controlling HHP's. The inventive concepts may be implemented by software capable of controlling an output node of the chipset depending on the anticipated state of the band.

It should also be noted that any number of bits may be inserted into the frequency command signal or the frequency data word to logically identify which of a plurality of bands the "new" frequency will reside, and to likewise automatically enable circuitry specific to the "new" band. Hence, circuits which support operation in one band of a dual band apparatus, or a single band in a multi-band apparatus, are enabled in response to the band bit(s) while the frequency data word is decoded by the controller for subsequent use by the frequency synthesizing circuitry. It is important to note that including and extracting one or more "extra" bits in/from the frequency command data does not disturb the frequency data word. Such operation is possible because these "extra" bits are bits which are typically rolled off the end of a shift register buffer in which the bits of the command signal are momentarily stored prior to being captured or locked by a data word locking signal, e.g., a latching signal or a data lock strobe signal. The timing of the data word locking signal actually controls the latching of the data of the frequency data word.

BRIEF DESCRIPTION OF THE DRAWING FIGURES

Figure 7:
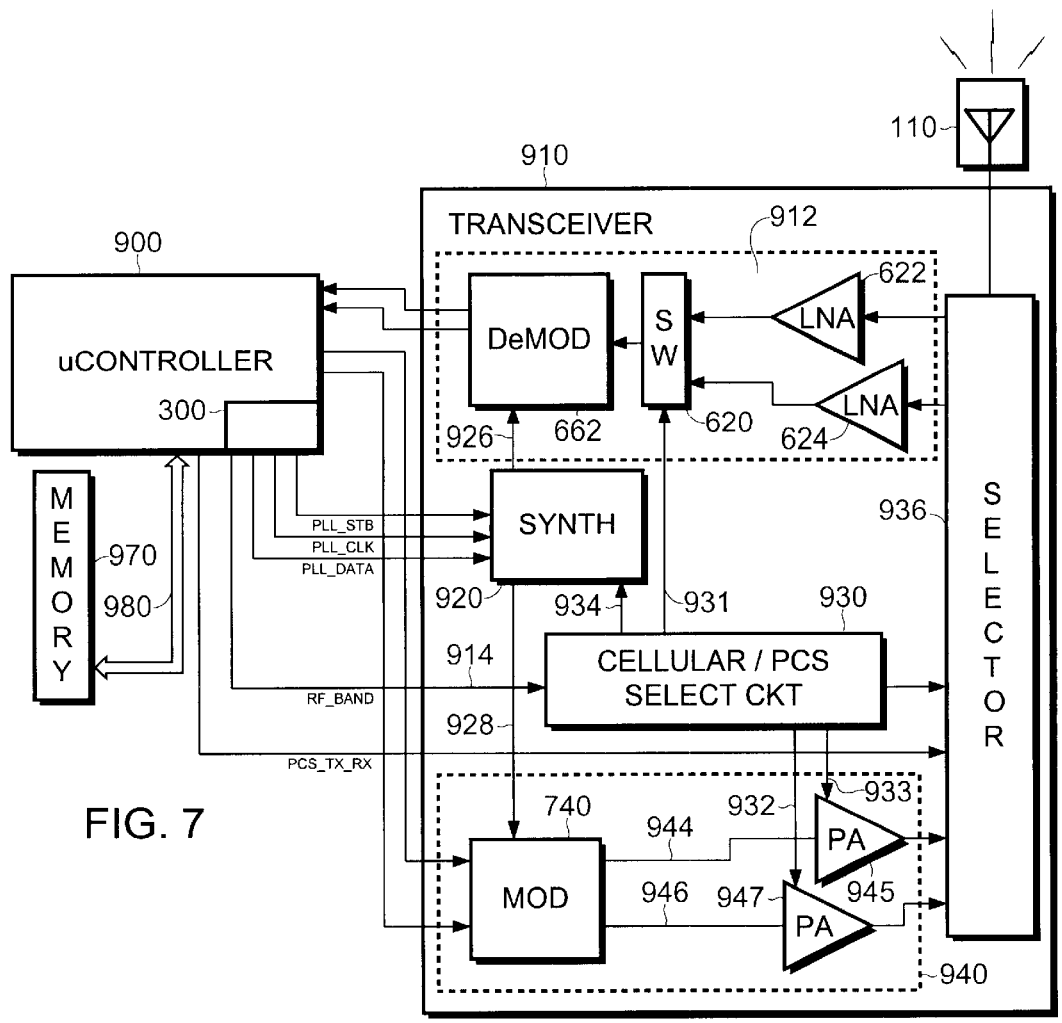
Figure 8:
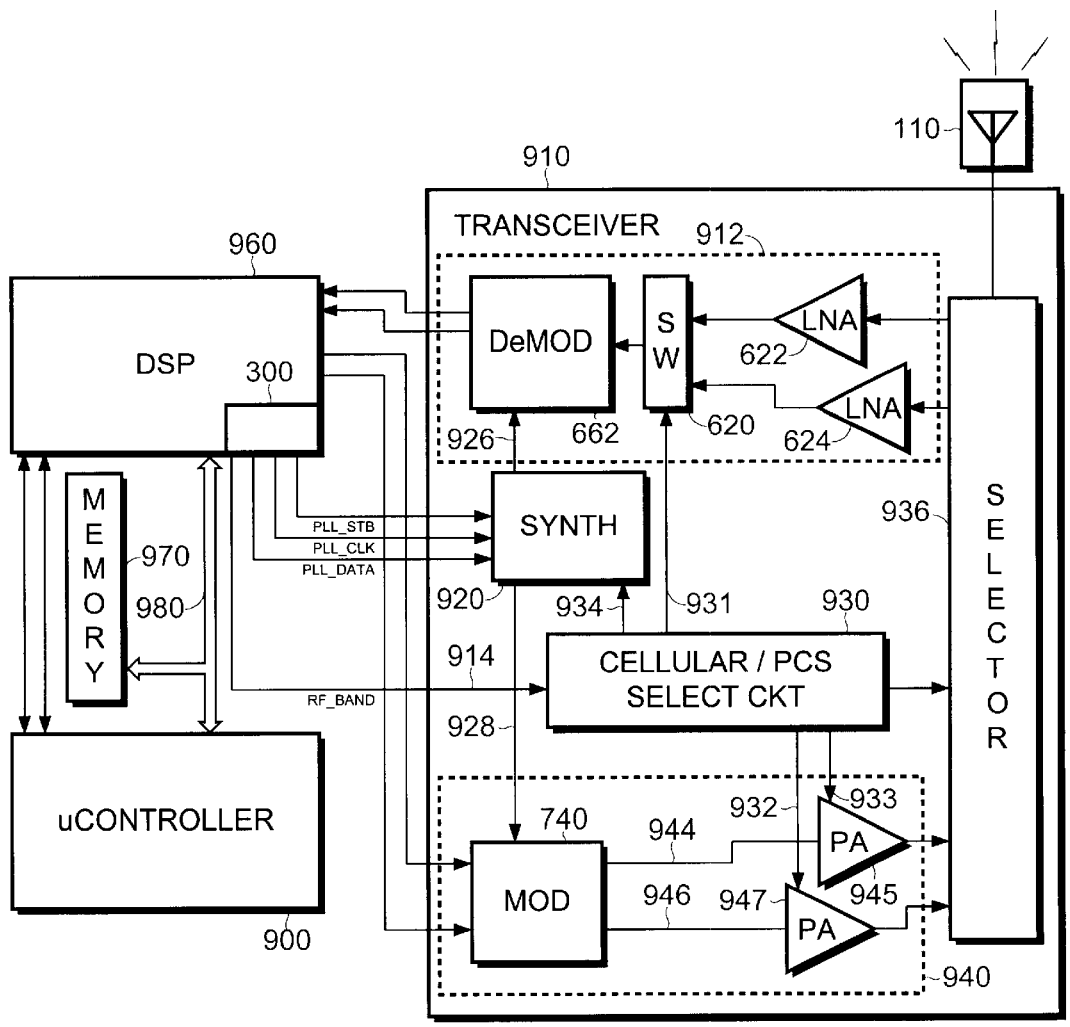

FIG. 7 is a high-level schematic diagram of a portion of a communication apparatus of the present invention in which transceiver band switching is implemented by a microcontroller programmed with a set of instructions for carrying out a method of the invention; and FIG. 8 is a high-level schematic diagram of a portion of a communication apparatus of the present invention in which transceiver band switching is implemented by a digital signal processor programmed with a set of instructions for carrying out a method of the invention.

DETAILED DESCRIPTION OF THE PREFERRED EMBODIMENTS

As mentioned above, the basic concept of this invention is to introduce apparatus and methods for timely activating band-specific circuitry within a communication apparatus upon receipt of a command. For example, upon receipt of a frequency change command used for defining another operating frequency within a "new" band, (cellular to PCS, or vice-versa), the invention automatically decodes, detects, or determines from the frequency change command a logical word which is used to activate band specific circuitry. Where the "new" frequency is not within the "old" band, not only is the frequency synthesizer set to synthesize the new frequency, but various transmit and receive circuits, including any band-specific circuitry, are enabled for operation in the new band while the controller and/or synthesizer tunes to the new operating frequency or channel. For example, various functional blocks or components, e.g., oscillators, filters, etc. (each individually hereinafter "band-specific circuitry"), within the transceiver of a communication apparatus such as an HHP must be selected, used, or switched on or off depending upon the current operating state of the system or circuitry as compared to the anticipated (or "new") operating state.

For clarification, when used herein, the term "band" is intended to mean a range of radio frequencies within a portion of the transmittable electromagnetic spectrum. For example, the cellular band, which was defined in broad terms above, currently refers to a range of frequencies extending from 869.01 MHz to 893.97 MHZ for receive signals, and 824.01 MHz to 848.97 MHz for transmit signals. The personal communications system (PCS) band likewise currently refers to a range of frequencies extending from 1930.050 MHz to 1989.990 MHz for receive signals and 1850.010 MHz to 1909.950 MHz for transmit signals. Regardless of the actual frequencies used, the term "band" as defined herein will generally imply the entire set of frequencies or channels (pairs of frequencies) implemented within a specific range of transmit and receive frequencies or channels for providing signaling to and from a mobile stations or FCC approved transceiver devices. These transceiver devices will typically include those particular type or Federal Communications Commission (FCC) class or class-type transceivers, such as cellular phones. Alternatively, they may include any other transmit and receive device approved by the FCC for use on frequencies which are allocated by the FCC, including but not limited to PCS and cellular phone frequencies.

Herein, an HHP transceiver or a mobile station implementing mobile assisted hand off (MAHO) will typically be discussed. However, while MAHO is but one example of a use for the inventive concepts discussed herein, the inventive concepts are not limited to MAHO. That is, the present invention extends beyond MAHO to include implementing any or all time critical processes, operations and/or states of a transceiver that would otherwise implement the process, operation, or state by use of a controller device or its equivalent only after receiving, processing by, and scheduling a controller command or signal to thereafter implement the new process, operation, or state.

Due to the significant difference in band frequencies and the various operational modes for a dual-band or multi-band communication apparatus, the hardware disclosed herein may include various band-specific filters, amplifiers, oscillators, circuitry and/or combinations thereof, which are used to implement the various operational or functional states of the communication apparatus. An HHP may be required to switch to various operating circuits or switch to various implementing hardware components within a relatively short period of time as compared to its operating cycle. For example, where an HHP is implementing a MAHO measurement, the HHP must tune to a new operating frequency, operate sufficiently long enough to receive and make a received signal strength measurement (RSSM), and then re-tune to the prior operating frequency or channel to continue transmitting data back to a supervising base station. Where an RSSM is made in another RF band, the HHP circuitry should tune to a channel in the "new" RF band within approximately 2 milliseconds, carry out a signal strength measurement, and then return to the active channel in the initial band within another 2 milliseconds. Due to the band to band transitions, the time available to actually implement the operational states and to actually carry out the MAHO related measurements can be improved by reducing the time it takes to complete each of the band to band transitions.

Figure 1:
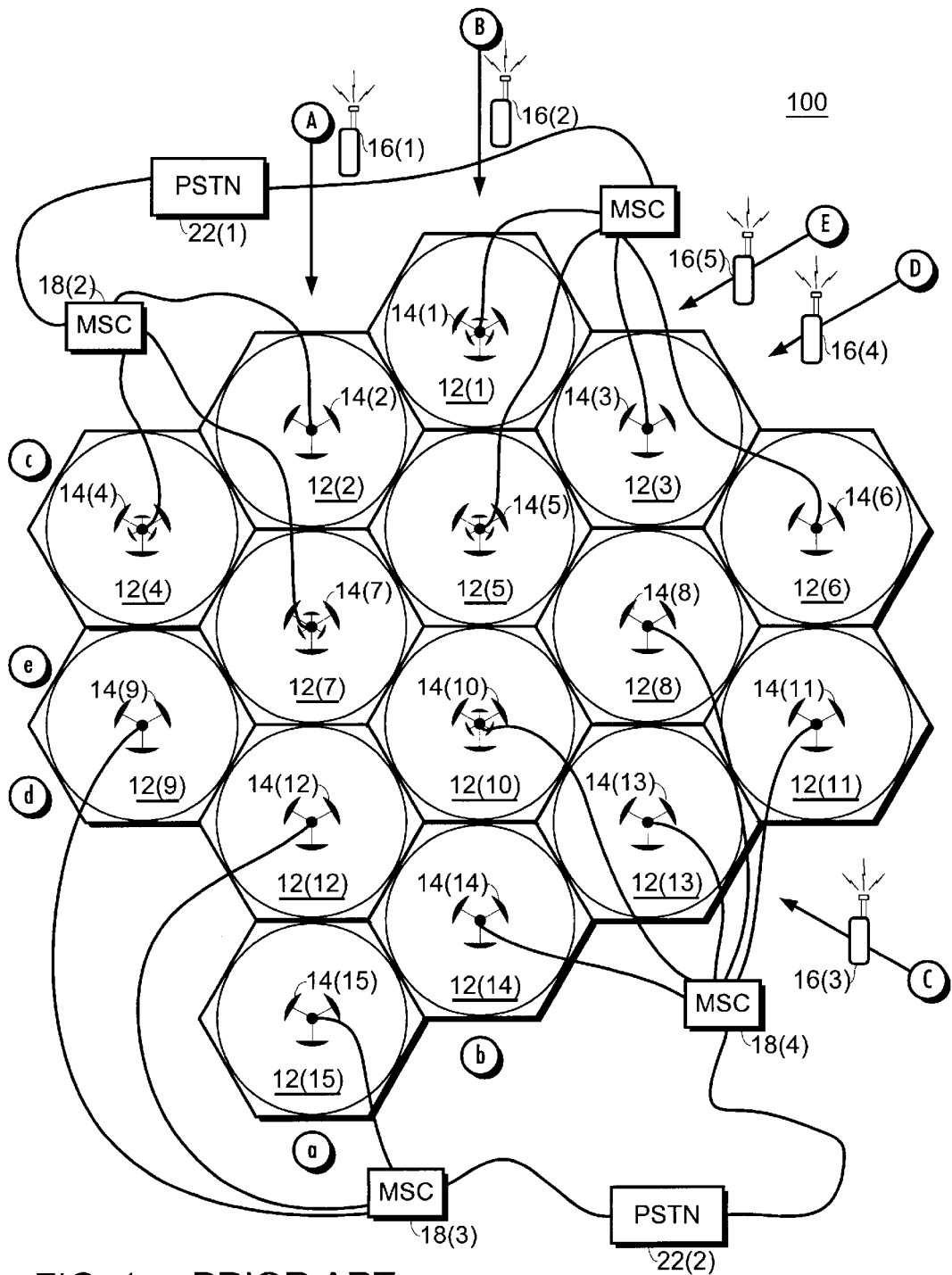
FIG. 1 is a overview diagram illustrating a conventional cellular telephone system in which the present invention may be implemented.
Figure 2A:
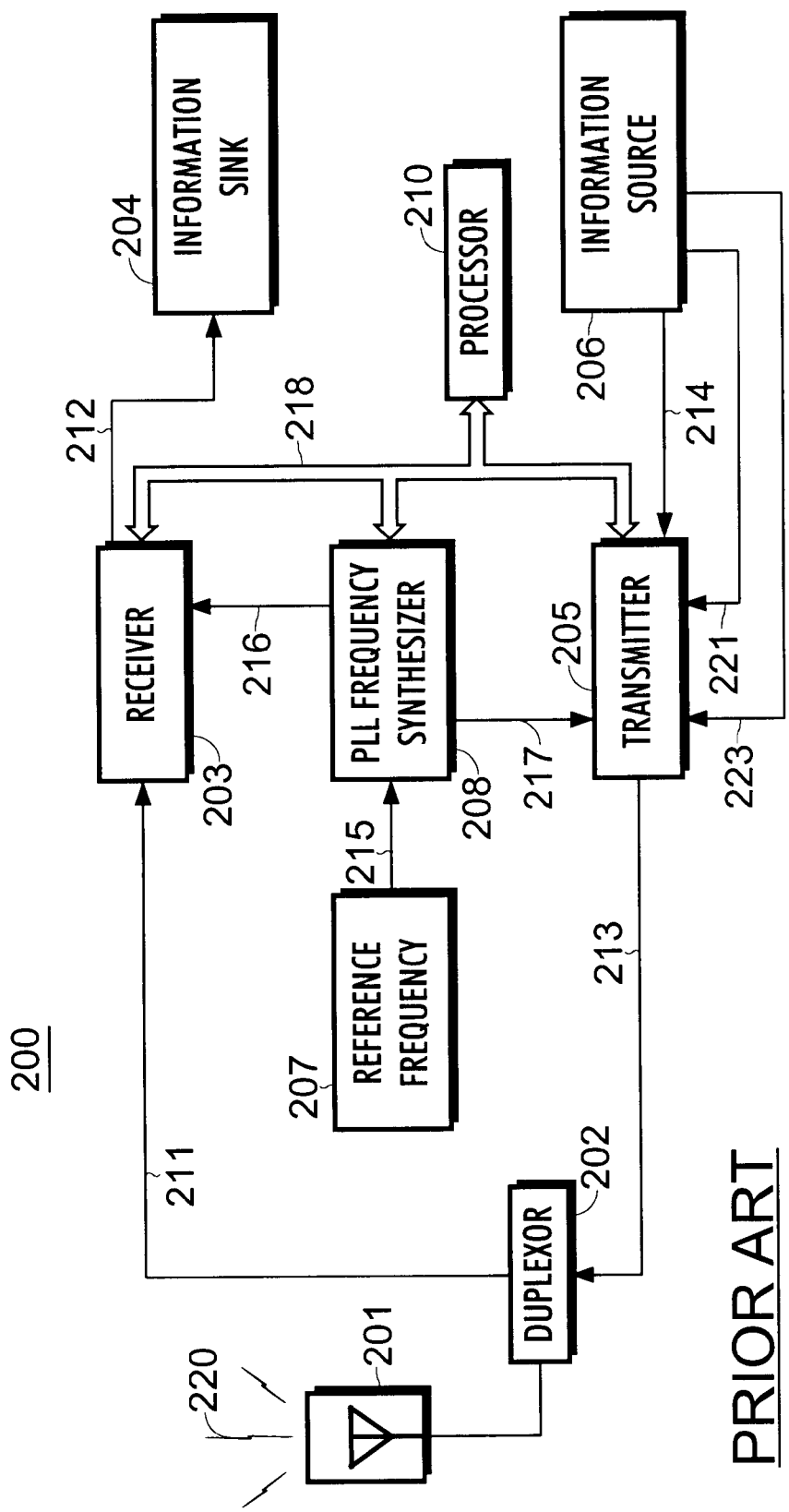
FIG. 2a is a prior art block level diagram of a conventional HHP.
Figure 2B:
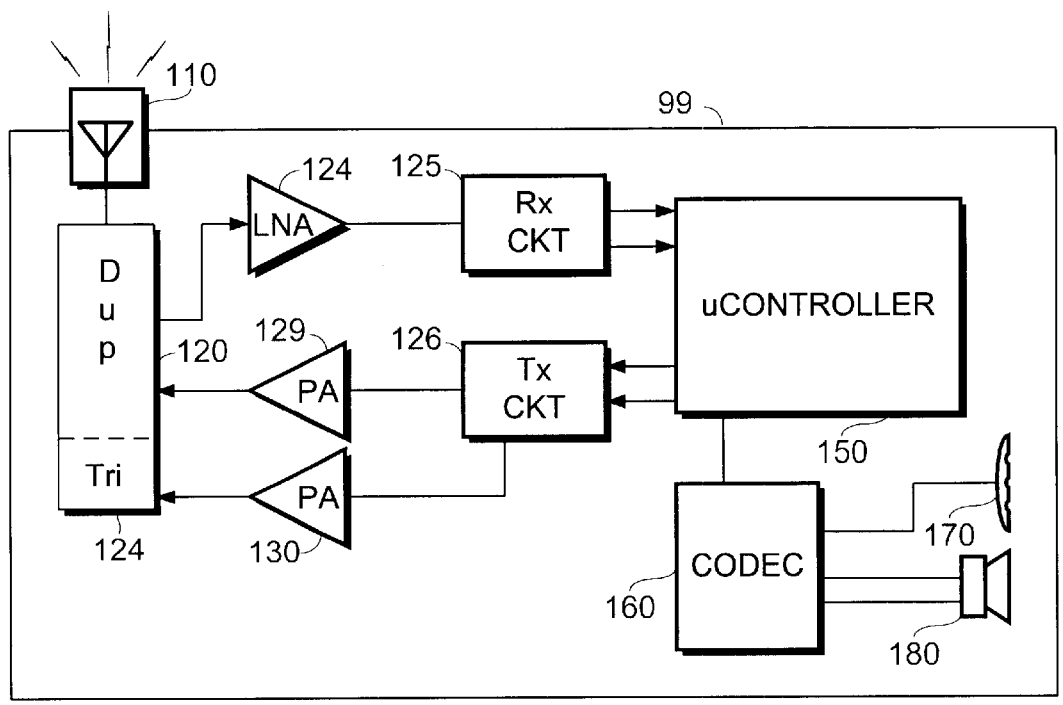
FIG. 2b is another prior art block level diagram of a conventional HHP.
Figure 2C:
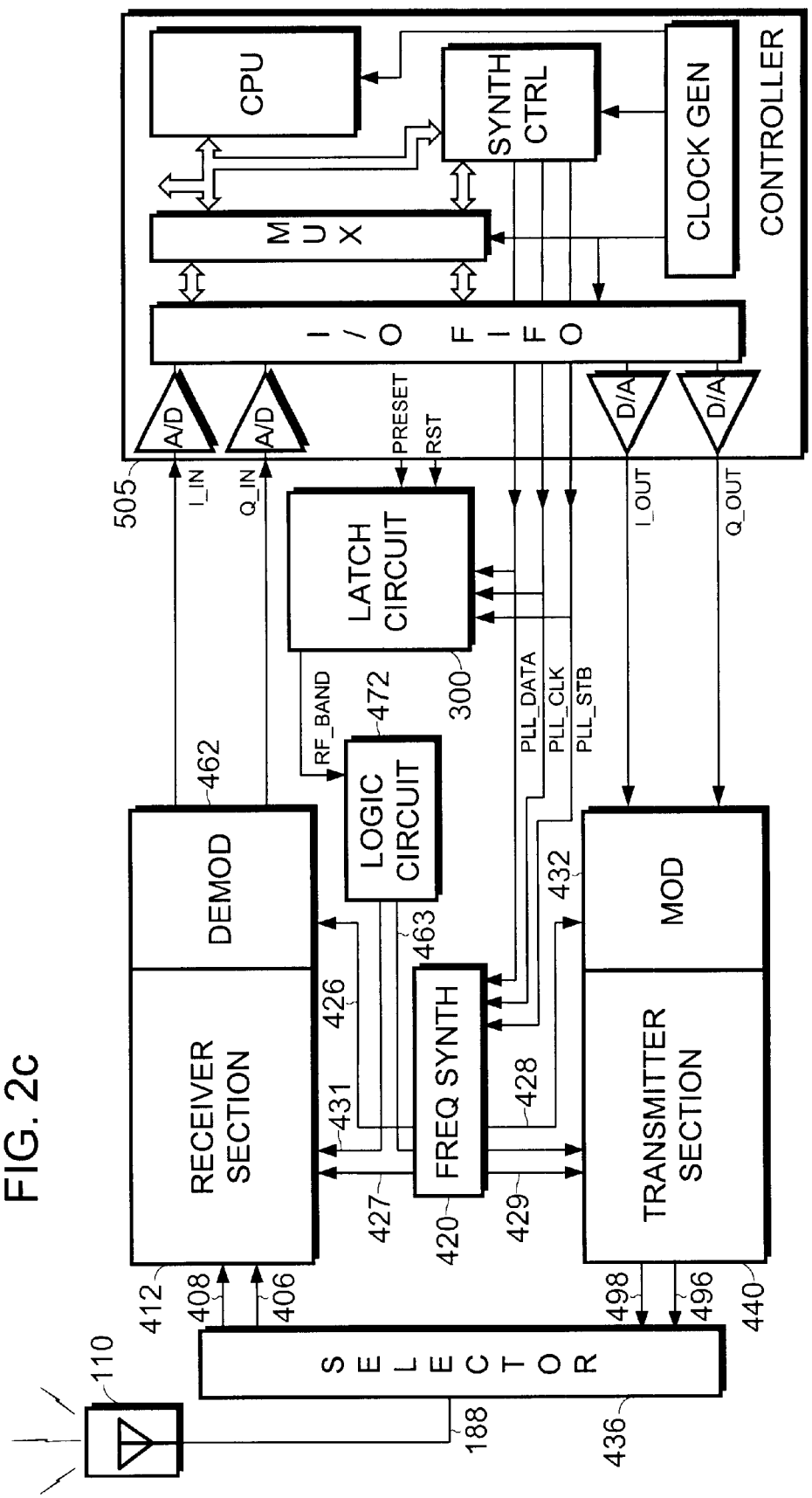
FIG. 2c is a block level diagram of a mobile station device implementing the present invention.

FIG. 2c shows a limited block diagram of an HHP including a transceiver and controller which employs the inventive concepts disclosed herein. Shown in FIG. 2c the block components of a preferred embodiment of the inventive concepts as implemented by a band to band control system for a cellular telephone. The band to band control system includes a receiver section 412, a transmitter section 440, a controller 505, a frequency synthesizer 420, a latching circuit 300, and an optional control and/or logic circuit 472. Also used by the control system is a selector 436 and an antenna 110.

Typically, antenna 110 receives an RF input/output (I/O) signal from a supervising base station. Selector 436 filters the RF I/O signal from antenna 110 thereby providing PCS and cellular band RF input signals on signal paths 406 and 408, respectively. When the desired RF input signal is in the cellular band, frequency synthesizer 420 and receiver section 412 operate such that the signal on signal path 408 is selected. Alternately, when the desired RF input signal is in the PCS band, frequency synthesizer 420 and receiver section 412 operate such that the signal on signal path 406 is selected. Frequency synthesizer 420 functions to provide downconversion oscillator signals to reciever section 412 via signal path 427 and demodulator 462 via signal path 427. The frequency synthesizer provides these receiver signals which oscillate at specific frequencies thereby selecting the appropriate frequency or channel of operation.

Frequency synthesizer 420 may optionally provide one or more control signals (not shown) to receiver section 412 to select either the RF input signal on signal path 406 or on signal path 408. Typically, such control signals from the frequency synthesizer will be in addition to any control signals from logic circuit 472 or latch circuit 300. The selected RF input signal is frequency downconverted in receiver section 412 and provided to demodulator 462 for demodulation. As shown in FIG. 2c, demodulation provides controller 505 input signals I_IN and Q_IN. Signals I_IN and Q_IN are each converted into representative digital values using analog to digital converters and then provided to the CPU of controller 505 for evaluation and/or processing.

The CPU of controller 505 processes or evaluates the input data received from receiver demodulator 462 and schedules and/or cancels the appropriate tasks, functions, control signals, etc., and schedules and implements the appropriate states or conditions of the HHP for further operation. In the case of MAHO, where the controller determines it should switch radio frequency bands, then the CPU of the controller sends a binary stream of frequency data bits from the controller 505 to the frequency synthesizer 420. This stream of bits is used to set the operating frequency or frequencies of the frequency synthesizer. The CPU of controller 505 instructs the synthesizer control circuit of controller 505 to provide the proper frequency data bitstream or data word to the frequency synthesizer.

Figure 5:
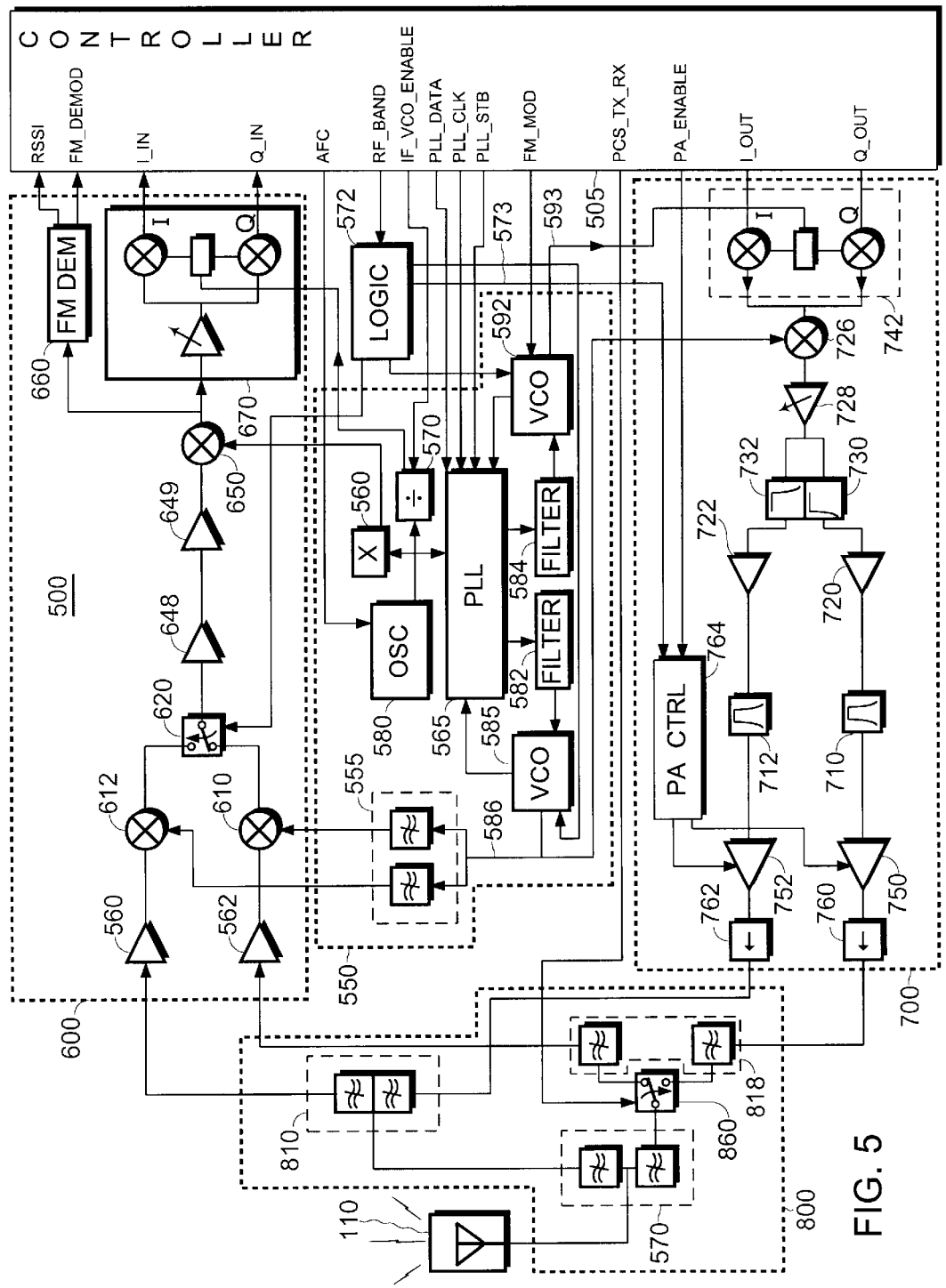
FIG. 5 is a schematic diagram of a transceiver including a logic control circuit responsive to the band switching signal.

In the preferred embodiment, FIG. 5 shows an HHP of this invention including a PLL 565 using a bitsteam comprised of twenty-two bits for specifying the PLL operating frequencies. In addition to the twenty-two frequency bits, an additional or "extra" band bit or functional bit is incorporated into the bitstream prior to the first bit used for frequency synthesizer control. These twenty-three bits forming the bitstream are shifted from the controller to the frequency synthesizer via signal line PLL_DATA. Signal line PLL_CLK provides a clocking signal for synchronizing the transmission of the bitstream on signal line PLL_DATA. The controller also provides a control signal, PLL_STB for indicating the beginning and ending of valid data on signal line PLL_DATA. When PLL_STB goes low, the next rising edge of clock signal PLL_CLK is used to capture the first data bit of the twenty-three bit frequency data stream into the latch circuit of FIG. 3. The bitstream is clocked through a serial data register within the frequency synthesizer so that the last twenty-two bits of the bitstream are in the register when PLL_STB goes high.

Conventional synthesizers, such as that shown in FIG. 2b, typically have a limited data word length for selecting frequency channels. These synthesizers, in order to change bands, use a data strobe or lock signal (e.g., PLL_STB) to latch a frequency data word thereby defining the "new" frequency within the "new" band. The data word is included within a bitstream derived from a frequency command signal. The present invention, however, also latches an additional bit in the bitstream which is used to provide a band definition signal (e.g., RF_BAND) to thereby activate, de-activate, utilize, or switch various band-specific circuitry. The band specific circuitry will typically be enabled or effected for use before or contemporaneously with the latching and decoding of the frequency data word by the frequency synthesizer.

The present invention, in one embodiment, implements time-critical operational switching by monitoring the command data directed from the controller or microprocessor for an indication that an operational change is forthcoming. Specifically, in the MAHO procedure, a band to band change is effectuated by capturing and holding the band identifying bit incorporated into the frequency data command bitstream. A logic signal is generated therefrom and sent to various band-specific circuitry or functional blocks to enable or disable circuitry or functional blocks while the actual command signal is processed or further processed by the frequency synthesizer.

Preferably, a latch circuit captures the state of at least one functional bit or the additional bit (the "extra" bit) included with a frequency data word present in a data bit stream. The additional bit was historically not part of the frequency data word, but has been subsequently incorporated into the bitstream and used to identify the specific band of operation (e.g., cellular or PCS). At least one prior art synthesizer command data word used a fixed length bitstream of only twenty-two bits, and these data word bits were shifted into or through a bit register of a phase locked loop (PLL) in a serial manner. After a sufficient amount of shifting, the bit register contained only the twenty-two bits defining the frequency of operation. In the invention described herein, an "extra" band bit is incorporated into the bitstream, but this "extra" bit is shifted out of the 22-bit register and otherwise made available for use elsewhere. In the preferred embodiment, the first-in and therefore first-out "extra" bit is captured by a latch circuit used to maintain the data of or value of the "extra" bit.

Figure 3:
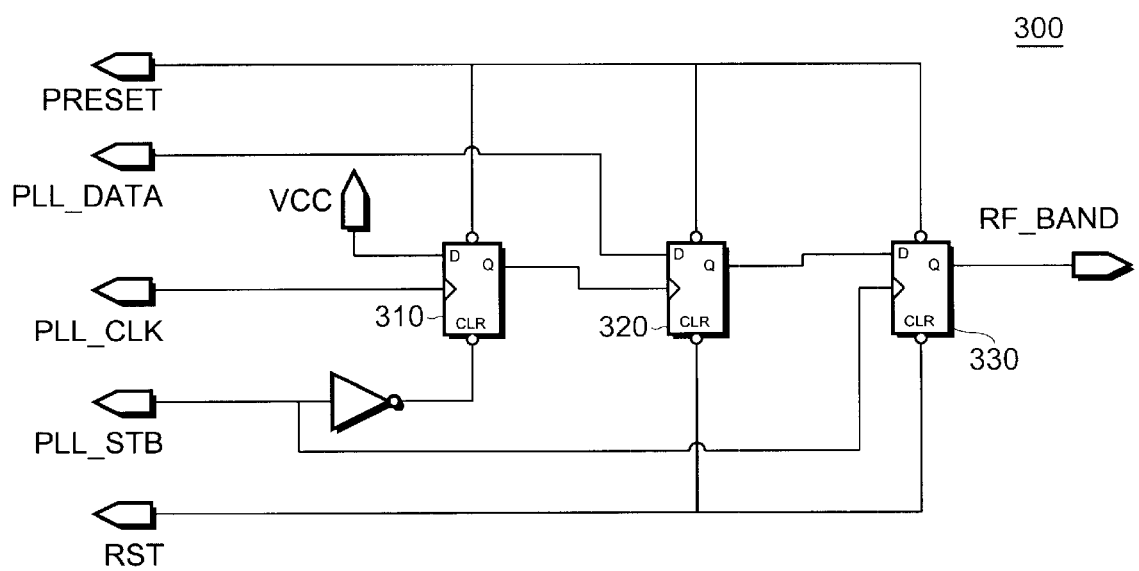
FIG. 3 is a schematic diagram of a latch circuit for use within a communication apparatus implementing the present invention.
Figure 4:
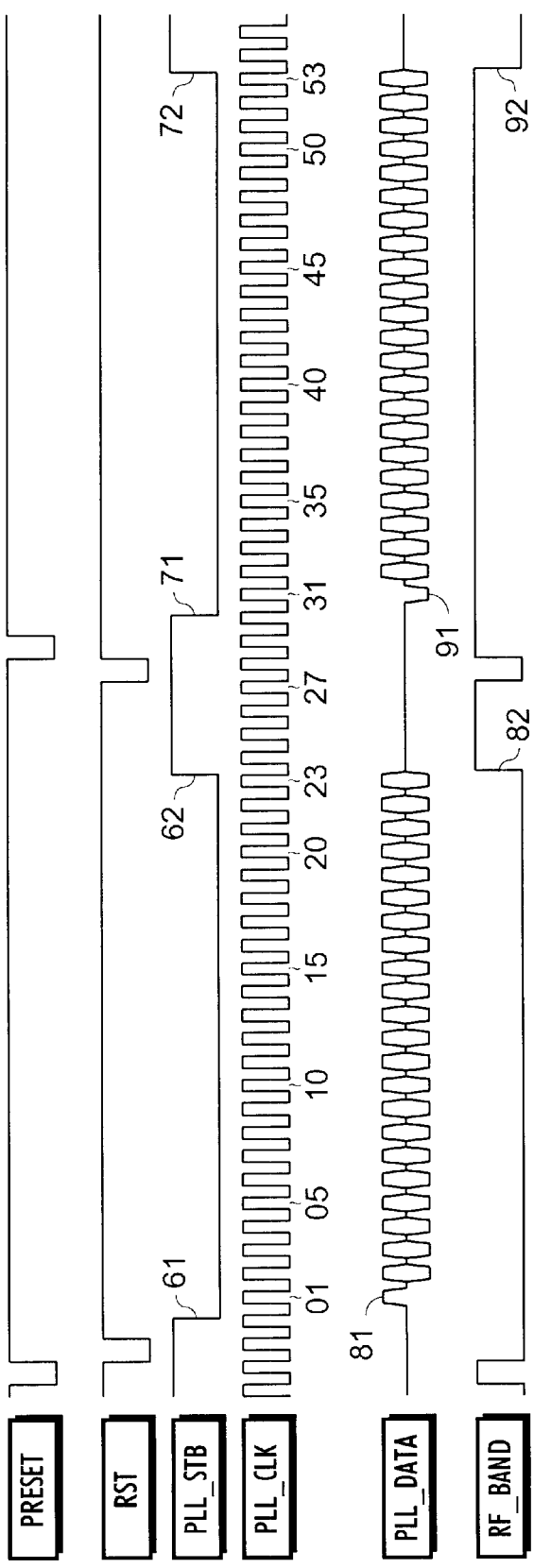
FIG. 4 is a timing diagram of the input and output signals of the bit capture circuit shown in FIG. 3.

A schematic diagram of latch circuit 300 used in implementing the inventive concepts herein is shown in FIG. 3. A representative timing diagram depicting the timing and operation of the latch circuit 300 is shown in FIG. 4. Latch circuit 300 includes first, second, and third D-type flip-flops 310, 320, and 330, respectively, configured as shown. It should be noted that while latch circuit 300 is implemented in the preferred embodiment as shown in FIG. 3, other implementations will typically be employed by those skilled in the art. Likewise, a variation in latch circuit 300 will be required for capturing more than a single functional bit per data word.

Latch circuit 300 uses a set signal (PRESET) provided to each of the "set" inputs of each of flip-flops 310, 320, and 330, which when at a low logic value, presets RF_BAND to a high logic value. Latch circuit 300 also uses a reset signal (RST) provided to the reset inputs of flip-flops 320 and 330, which when at a low logic value, presets RF_BAND to a low logic value. The PLL_DATA signal comprises high and low logic value data derived from a received frequency command signal and directed to the frequency synthesizer from the controller. PLL_DATA data is provided to the D-input of D-type flip-flop 320. The PLL_CLK clock signal is provided to clock flip-flop 310. D-type flip-flop 310 is driven at its D-input by Vcc, and the D-input of flip-flop 330 is driven by the Q output of flip-flop 320. A strobe signal, PLL_STB is provided to the clock input of D-type flip-flop 330. An inverted version of PLL_STB (inverted by invertor 340) is provided as the reset input to flip-flop 310. The RF_BAND signal is provided from the Q output of flip-flop 330. The Q output of flip-flop 310 is provided to the clock input of flip-flop 320. The RF_BAND signal is used to actuate or effect the appropriate band specific circuitry using one or more optional logic circuits.

Shown in FIG. 4 is a representative timing diagram further depicting the operation of the latch circuit shown in FIG. 3. Upon PLL_STB going low at 61, the data on PLL_DATA signal line becomes valid. The first PLL_DATA bit after the PLL_STB goes low (shown at 81) and depicted during PLL_CLK cycle 01 is the "extra" band bit identified and is depicted at a binary high. The remaining data bits in PLL_CLK cycles 02 through 23 correspond to the frequency synthesizer data word used for setting the frequency synthesizer. Upon PLL_STB changing value or going to a binary high at 62, the data value (at 81) is provided to RF_BAND control signal line at 82. This data value remains on RF_BAND until a RST or PRESET or another valid RF_BAND value is provided. In a similar manner, the PLL_DATA bit which occurs at 91 and which is depicted during PLL_STB falling edge 71 at approximately PLL_CLK cycle 31, is a next occurrence of an "extra" band bit and is depicted to be at a binary low. The remaining data bits in PLL_CLK cycles 32 through 53 correspond to the next frequency synthesizer data word used for setting the frequency synthesizer. Upon PLL_STB going high at 72, the data value (at 91) is provided to RF_BAND control signal line at 92. This data value likewise remains on RF_BAND until a RST or PRESET or another valid RF_BAND value is provided. PLL_CLK cycles 24 through 30 represent at least one but perhaps as many as millions or more PLL_CLK clock cycles between the prior functional bit or data word and the next data word or functional bit. Likewise, the RST and PRESET signals in PLL_CLK cycles 28 and 29 are demonstrative and typically will not always be provided by the controller.

FIG. 5 depicts another transceiver unit 500 which implements the present invention. Unit 500 includes a controller 505 which executes a set of computer instructions stored therein within the controller 505 is shown in FIG. 5. The transceiver 500 shown in FIG. 5 includes frequency synthesizer 550 for generating the carrier signals to be modulated for transmission and used for demodulating received signals, a receiver section 600, a transmit section 700 and a selector or front end 800. Modulated carrier signals or RF I/O signals are input and output through front end 800. The method implemented by controller 505 for generating the RF_BAND signal is set forth in the flow chart of FIG. 6, which will be discussed below. The controller 505 (of FIG. 5) implements the function of the latch circuit of FIG. 3, as well as providing or accepting control and logic signals, voltage regulation signals, and PLL_DATA, PLL_CLK, PLL_STB, FM_MOD, FM_DEMOD, PCS_TX_RX, RF_BAND signals. One or more of these signals (e.g., RF_BAND) are used for transceiver frequency/band specific operation.

Front end 800 is attached to a receiving/transmitting antenna 110 which is connected to duplexer 570. Duplexer 570 is connected to switch 860, which is controlled by PCS_TX_RX transmit select signal to define whether the receiver section 600 will receive a PCS band modulated signal or transmit a PCS band modulated signal from transmit section 700. It should likewise be noted that while selector or front end circuit 800 is implemented in the preferred embodiment as shown in FIG. 5, other implementations will typically be employed by those skilled in the art.

In receiver section 600, RF signals received at duplexers 810, 818 of front end 800 are directed to first (cellular band) and second (PCS band) low noise amplifiers (LNAs) 560, 562, respectively. The output signal from PCS band LNA 562 is provided to mixer/downconverter 610. The output signal from cellular band LNA 560 is likewise provided to mixer/downconverter 612. Either mixer 610 or mixer 612 will be operational based upon the state of the RF_BAND signal. RF_BAND provides input to logic circuit 572 which controls voltage control oscillator (VCO) 585 via signal line 573 and in conjunction with PLL 565 thereby providing either a first VCO frequency (for PCS band) or a second VCO frequency (for cellular band). The VCO output signal 586 of VCO 585 is selected through band signal filter 555 and either mixer 610 or mixer 612 will be operational in receive mode. The intermediate frequency (I/F) outputs of mixers 610 and 612 are provided as inputs to I/F receive switch 620. Receive switch 620 is likewise controlled from logic circuit 572 in response to or based upon the band select signal RF_BAND.

I/F switch 620 directs either the cellular or PCS band I/F signal through first I/F amplifier 648 and through optional second I/F amplifier 649 into I/F downconverter/mixer 650, where the output from mixer 650 is provided to demodulator 670 for quadrature modulation and also provided to a second FM demodulator 660 for RSSI measurement determination for such operations as MAHO. Mixer 650 downconverts the I/F signal provided through switch 620 using a frequency multiplied oscillator signal provided by oscillator generator circuit 580 and multiplied by frequency multiplier 560. FM demodulator 660 provides RSSI output signal and FM_DEMOD output signal as inputs to controller 505. Demodulator 670 provides I and Q input signals (I_IN and Q_IN, respectively) to controller 505. Controller 505 uses Received Signal Strength (RSSI) input signal and Frequency Modulated/DEModulated input (FM_DEMOD) signal for processing, evaluating, or determining the current received signal strength.

Transceiver 500 is connected to logic circuit 572 from which it directly receives the band select signal RF_BAND from controller 505. A phase lock loop (PLL) 565 inputs from the controller the frequency data word PLL_DATA into a 22-bit serial register located within the PLL (not shown). The bitsteam comprising the frequency data word is clocked into the PLL 565 using clock signal PLL-CLK and is timely latched into the register of the PLL 565 when control signal PLL_STB signal changes logic value. Upon entry of a valid data word and the operational need to implement another state or function in the transceiver, PLL 565 will likely generate, or change the frequency of, or discontinue the VCO output signal 586 provided from VCO 585, and/or generate, change the frequency of, or discontinue modulation oscillator signal 593 from VCO 592. VCO output signal 586 is tuned to oscillate at the appropriate frequency by PLL 565, RF filter 582, and VCO 585. In a similar manner, modulator oscillator signal 593 is tuned to oscillate at an appropriate local oscillator signal frequency such that I/Q modulator circuit 732 converts controller 505 output signals I_OUT and Q_OUT into a composite modulated I/F signal for RF upconversion by mixer 726.

Oscillator 580 is controlled by Automatic Frequency Control (AFC) signal supplied from controller 505 and generates a reference signal which is frequency divided within divider 570 in accordance with an VCO enable signal (IF_VCO_ENABLE) from controller 505, which is frequency multiplied by multiplier 560, and provided to PLL 565. The multiplier 560 output is provided to the IF downconverter/mixer 650. The divider output is provided to demodulator 670 for demodulation of the I and Q components of the I/F downconverted input signals.

Transmit section 700 includes a PA_CTRL circuit 764 which receives as one input a control signal derived from RF_BAND outputted from logic circuit 572. A second control signal, the power amp enable signal PA_ENABLE, is output from controller 505 and used to enable or disable the functioning of both power amplifiers, 750 and 752. Transmit section 700 also includes an I/Q modulator circuit 742 which modulates the I_OUT and Q_OUT signals provided by controller 505 using the modulation oscillation signal 593. The output of I/Q modulator circuit 742 is also provided to upconversion mixer 726, which uses the VCO output signal 586 from VCO 585.

Mixer 726 output signal is amplified by (variable) line amplifier 728 and provided as an input signal to higher (PCS) and lower (cellular) signal pass filters 730 and 732, respectively. Output from higher (PCS) signal pass filter 730 is pre-amplified by amplifier 720 and frequency filtered in band pass filter 710. The filtered output signal is amplified by output level-adjustable power amplifier 750 which is controlled and/or enabled by an output signal of PA_CTRL 764 and then provided to signal isolator 760. The output of signal isolator 760 is provided to duplexer 818 for transmission by front end 800. In a similar manner, output from lower (cellular) signal pass filter 732 is pre-amplified in amplifier 722 and frequency filtered in band pass filter 712. The filtered output signal is amplified by a output level-adjustable second power amplifier 752 also controlled by an output signal of PA_CTRL 764 and then provided to second signal isolator 762. The output of second signal isolator 762 is provided to duplexer 810 for transmission by front end 800.

In regards to a MAHO request from a base station, the transceiver system shown in FIG. 5 will be operating in a first band, perhaps the cellular band. Upon receipt of the cellular band RF I/O signal by antenna 110, the RF input signal proceeds on a signal path from antenna 110 to LNA 560, is amplified, and outputted to downconverter/mixer 612. Mixer 612 provides the signal to switch 620 (already positioned to select the output from mixer 612) and to provide amplifiers 648 and 649 with the IF signal. Amplifier 649 provides its output signal to downconverter/mixer 650 which provides the downconverted output to demodulator 670. Demodulator 670 provides analog input signals to D/A converters within controller 505. Controller 505 processes and/or evaluates the Q_IN and I_IN signals and thereafter schedules the MAHO measurement by providing a frequency data word to the frequency synthesizer 550.

Latch circuit 300, implemented by use of an ASIC device, captures the "extra" or functional bit used to specify the "new" operating band, in this example, the PCS band, from the controller 505, upon the transition of PLL_STB from invalid to valid data. In the preferred embodiment, upon the transmission of a rising edge of PLL_STB latch circuit 300 transfers the data value of the captured or "extra" bit and holds that data value on band select signal RF_BAND. The RF_BAND signal is typically held until the controller 505 resets the RF_BAND signal or sends another frequency change (with band change) data word or the frequency synthesizer can provide the appropriate control signals. The changing of the band select signal RF_BAND causes switch 620 and switch 860 to select the PCS signal path to and from LNA 562, and specifically enabling downconverter/mixer 612. Typically, the switching and the enabling of the specific band circuitry will occur either before or during the frequency synthesizer's 550 tuning to the appropriate local oscillator frequency or frequencies.

In a similar manner as before, the PCS RF input signal is downconverted and amplified until it reaches IF downconverter/mixer 650 and through the signal path including LNA 562. The output of mixer 650 is provided to FM Demodulator 660 which provides demodulated signals to controller 505 for determination of signal strength. The controller processes and/or evaluates the signals provided from FM Demodulator 660, thereby measuring the signal strength of the particular PCS channel momentarily tuned to by the transceiver. Upon completing the channel or signal strength measurement, the transceiver reverses the switching process by sending another frequency data word and an additional frequency band bit to the frequency synthesizer and the latching circuit on PLL_DATA so that the mobile station can once again communicate with the base station (e.g., the cellular band base station) which had previously requested the MAHO measurement.

It should be noted that in a MAHO measurement, the transmitter section of the transceiver may never actually need to be switched or enabled to complete a MAHO measurement since the transceiver is not required to communicate with the "new" base station. However, in a hand-off procedure, particularly where the hand off is from a first band base station to another band base station, portions of the transmitter section may need to be activated or effected while other portions are deactivated or disabled. As shown in FIG. 5, at least the power amplifiers (PA's) 750 and 752 will be effected.

During typical communication operation of a MS, various cellular or PCS band specific circuitry can be switched on and off within the transceiver based on the state of the frequency command data and along with the "extra-bit" signal provided to the frequency synthesizer. From the inputted frequency command data, either explicitly or implicitly supplying the data for the "extra bit" signal, the operation of controller 505 generates and outputs either the "extra bit" signal and/or the RF_BAND signal for enabling and/or disabling band specific circuitry. In a TDMA system, such as those presently deployed in the U.S., the base station is in communication with the HHP only one third of the time when in full rate operation or maximum communication. The remaining two-thirds of the time is available for the HHP to use to provide other communication services from base stations employing differing bands, thereby reducing the need for redundant services in each base station or each band of operation.

Figure 6A:
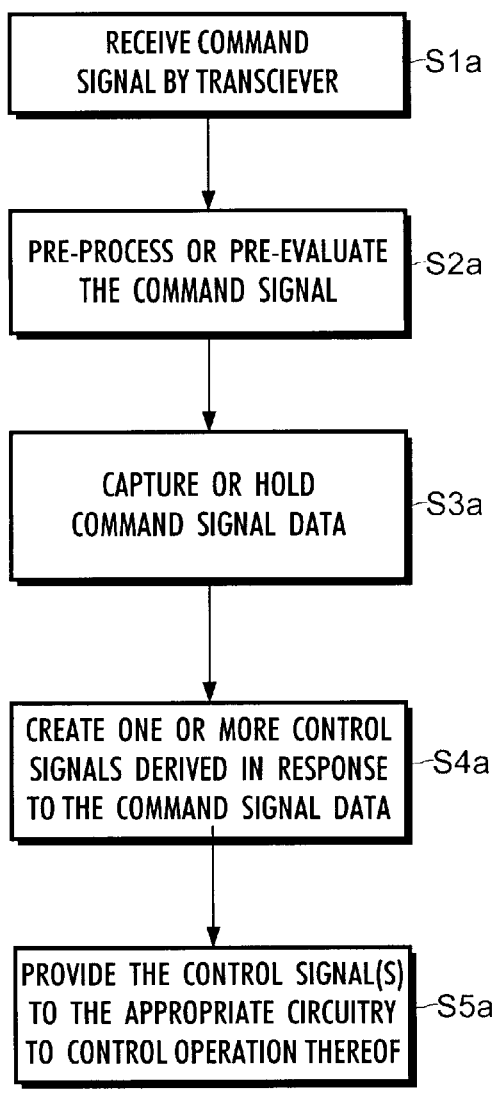
FIG. 6a is a flow chart depicting the generalized method of the present invention.
Figure 6B:
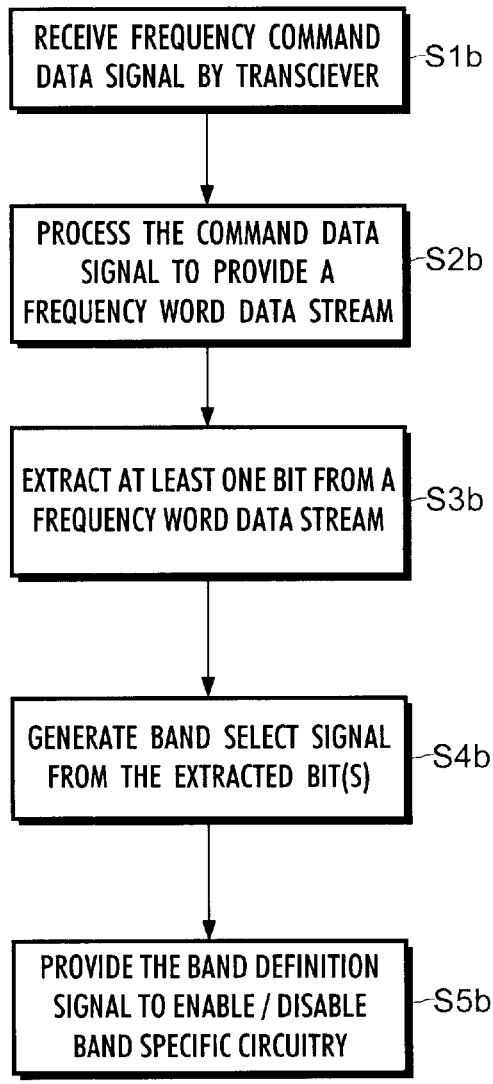
FIG. 6b is a flow chart depicting the method of the present invention as applied to band to band switching.

The method of the present invention is generally explained as shown and in accordance with the flow chart of FIG. 6a; and, in the case of MAHO, as specifically explained in accordance with the flow chart of FIG. 6b. Step S1a, as shown in FIG. 6a, indicates receipt of a command data signal by a transceiver wherein communication signals are evaluated in the communication apparatus by means including a microprocessor, microcontroller, or another equivalent device programmed by a set of instructions. Step S1b, as shown for the specific process of MAHO in FIG. 6b, indicates the reception of a command signal including frequency command data or information. At step S2a of the generalized process shown in FIG. 6a, the data signal's data is pre-processed or pre-evaluated by the controller to determine the actual command or function specified by the data signal's data. In the specific process of FIG. 6b (at step S2b), the frequency command data signal is processed or evaluated by the controller or microprocessor to determine the frequency data word included in the frequency word bit stream provided to the frequency synthesizer. In the preferred embodiment, a 22-bit frequency data word and at least one "extra" bit is used to indicate the frequencies to be applied by the frequency synthesizer and the frequency band in which the synthesized frequencies (or their equivalent carrier channels) reside.

Generally, step S3a includes extracting the functional command bit or bits from the received data signal data or subsequent related data (e.g., subsequently processed by the controller) and holding the data by whatever means such as a latch or register. In the specific instance of MAHO, Step S3b includes extracting the "extra" bit signal from a frequency word bit stream derived from the frequency command data signal. Step S4a includes generating one or more control signals used to enable, disable or effect specific circuitry in the transceiver device, as is well known in the art. In the specific procedure of FIG. 6b, Step S3b includes generating a band selection signal from the "extra" bit, e.g., RF_BAND, for controlling the operation of the receiver section and other circuitry in response to a band select signal derived from latching the "extra" bit within the frequency data bit stream. The captured or band select signal provides at least one control signal which can be used to control a portion of the operation of the transceiver.

In most instances, either the controller or some other control device will need to make some sort of pre-determination of the future state or operating condition of the HHP or transceiver. This is applicable in most synchronized systems, but there may be an occasional instance where the functional command could be extracted prior to any processing by the controller. However, typically, at least some pre-processing will be necessary to establish the timing and/or bit framing of the command signal as related to the functioning of the controlled device as a whole. Once the command data or frequency data has been at least pre-evaluated, either by the controller or by some other means with the device such as circuitry, then the controller (or other means) provides one or more control signals to control the operation of the HHP, or, as specifically described in regards to MAHO, to set the operating frequency or frequencies of the frequency synthesizer.

Generally, step S5a includes providing one or more such control signals to the circuitry or other components of the HHP device thereby controlling such circuitry or other components until such time as the controller resumes control over the circuitry or components. Step S5b, for MAHO, includes providing a band select signal to appropriate portions of the transceiver circuits which control operation of band specific circuitry within the transceiver. In this way, time-critical operation such as switching on or off any of the band critical components is implemented in a reduced time to completion method.

In an alternative embodiment to the transceiver 500 of FIG. 5, the method of the present invention may be implemented by using a microcontroller or microprocessor, etc., identified as element 900 in FIG. 7. Microcontroller 900 extracts the one or more bits from the bit stream of the frequency command data signal to generate band select signal RF_BAND. This extraction is typically done by pre-processing or pre-evaluation of the frequency command signal's data prior to full evaluation of the command signal sent the the HHP or MS. This will typically be done by specific routines or designated instructions for use by the controller and will generally be done after the HHP or MS has completed timing synchronization with the controlling base station.

Microcontroller 900 is connected to memory 970 via bus 980, and to transceiver 910 through various input/output signal paths. Transceiver 910 includes a receiver section 912, a synthesizer section 920, a cellular/PCS select circuit 930, a selector 936 and a transmit section 940. The selector 936 is also connected to a transmit/receive antenna 110. Microcontroller 900 provides PLL_STB, PLL_CLK and PLL_DATA signals to synthesizer 920, RF_BAND signal to Cellular/PCS Select circuit 930, and two microcontroller output signals (typically, I and Q) as input to a modulation circuit 740 within transmit section 940 of transceiver 910. One or more local oscillator inputs 928 from frequency synthesizer 920 provide additional control to modulator 740 for appropriate generation of I/F and RF cellular and PCS signals to PAs 945 and 947, respectively, via lines 944 and 946.

Cellular/PCS Select Circuit 930 controls the output of PAs 945 and 947 via signals provided thereto via control lines 933 and 932, respectively. Cellular/PCS Select circuit 930 also provides an optional control signal to synthesizer 920 via line 934, as well as a control signal to input select switch 620 in receiver section 912 and a control or switch signal to selector 936. Selector 936 provides cellular and PCS signals to LNAs 622 and 624, the outputs of which are provided to input select switch 620. The switch controls which RF or IF band signal is provided to demodulator circuit 662, which also provides I and Q received input signals to microcontroller 900.

The microcontroller 900 shown in FIG. 7 utilizes a preprogrammed set of instructions to synchronize the operation of the HHP device to that of the controlling base station or the incoming RF command signal. Once the microcontroller 900 has synchronized with the incoming command signal data, the microcontroller utilizes a reduced set of instructions of monitoring the incoming commands provided to the microcontroller. If and when an appropriate command is processed or evaluated, various control signals are generated and ouput as discussed above.

In yet another alternative embodiment, FIG. 8 shows a transceiver 910 connected directly to a digital signal processor (DSP) 960. DSP 960 is also in direct communication with a microcontroller 900. Both microcontroller 900 and DSP 960 are connected to a memory 970 via memory bus 980 which stores the instructions for implementing the method thereby. It is the interaction between the microprocessor and the DSP which is responsible for generating the RF_BAND signal output by the DSP 960 for controlling band selection in cellular/PCS select circuit 930 in transceiver 915. In addition, DSP 960 generates and receives all of the signals as set forth above with respect to microprocessor 900 of FIG. 7. Like elements in FIGS. 7 and 8 are like numbered.

It is believed that the operation and construction of the present invention will be apparent from the foregoing description. While the method, apparatus and systems shown have been characterized as being preferred or alternative embodiments, it will readily become apparent, particularly to those skilled in the appropriate art, that various changes and modifications can be made to the inventive concepts described herein without departing from the true spirit and scope of the invention defined herein as appropriately determined by the claims.

What is claimed is:

1. A method for providing band selection in a communication apparatus with band to band operating capability, the communication apparatus including a receiver section, a transmitter section, a frequency synthesizer and a controller, the method comprising:
   receiving a frequency command data signal, the frequency command data signal used for deriving a bit stream, the bit stream including a frequency data word defining a synthesizer operating frequency and at least one functional bit for specifying a mode of operation;
   extracting the functional bit from the bit stream to generate an operational signal;
   providing the operational signal to the receiver section to modify operation thereof; and,
   utilizing the frequency data word to further modify operation of the communication apparatus.

2. The method of claim 1, further comprising the steps of:
   providing a latch signal from the controller for latching the functional bit;
   further utilizing the frequency data word by the controller for generating at least one data signal; and
   providing the data signal to the frequency synthesizer to effect operation thereof.

3. The method of claim 1, wherein the step of extracting includes holding the functional bit for at least the time the controller utilizes to implement a functionally similar condition within the receiver section.

4. The method of claim 1, wherein the step of extracting includes holding the functional bit for at least the time the controller utilizes to evaluate the frequency command data signal and implement the operational state defined by the functional bit.

5. The method of claim 1, wherein the step of extracting includes holding the functional bit for at least the time the controller utilizes to evaluate the frequency command data signal and implement the operational state defined by the frequency command data signal.

6. The method of claim 1, wherein the step of utilizing the frequency data word by the controller includes coupling the controller to a digital signal processor programmed with a set of computer instructions for evaluating the frequency command data signal.

7. The method of claim 1, wherein the step of utilizing the frequency data word includes coupling the controller to a logic circuit for controlling operation of the communication apparatus.

8. The method of claim 7, wherein the logic circuit includes circuitry of an application specific integrated circuit (ASIC).

9. A communication apparatus including:
   a receiver section for receiving a command signal wherein the command signal includes a data stream of bits for commanding the operation of a portion of the communication apparatus;
   a transmitter section for transmitting an output signal in a predetermined transmit format;
   a controller for controlling the operation within the communication apparatus and which is responsive to certain data within the data stream;
   a latching circuit responsive to the controller for capturing within a latch device a portion of the data of the data stream; and,
   a selecting circuit responsive to the data portion captured by the latching circuit, and wherein the selecting circuit is responsive to the data portion captured prior to a similar operation by the controller.

10. The communication apparatus of claim 9, wherein the selecting circuit includes circuitry implemented in an application specific integrated circuit (ASIC).

11. The communication apparatus of claim 9, wherein the selecting circuit includes a switch responsive to the data portion and which enables at least a part of the receiver section.

12. The communication apparatus of claim 9, wherein the selecting circuit includes a switch responsive to the data portion and which switches the receiver from a first signal path to a second signal path.

13. The communication apparatus of claim 12, wherein the switch responsive to the data portion operates prior to a similar functional operation of the controller.

14. A circuit for implementing first band to second band selection in a communication apparatus, the communication apparatus including:
   an input/output circuit including a latch circuit for receiving a portion of a frequency command data signal, wherein a bit or bits derived from the frequency command data signal are used for specifying an operational band;
   a receiver connected to the input/output and the latch circuits;
   a transmitter connected to the input/output and latch circuits; and,
   a frequency synthesizer connected to a controller, the receiver, and the transmitter, wherein the frequency synthesizer is responsive to data derived from the portion of the frequency command data signal, and wherein the latch circuit utilizes the bit or bits and a clock signal to provide a band select signal for effecting selection of a second band by the communication apparatus.

15. The controller of claim 14 further comprising a plurality of output nodes for providing control signals to the input/output circuit, the receiver, and the transmitter for controlling operation of each thereof in response to the data included within the frequency command data signal.

16. The circuit of claim 14 further comprising a logic circuit connected to an output node of the controller, the logic circuit providing control signals to the input/output circuit, the receiver, and the transmitter for controlling operation of each thereof in response to the data included within the frequency command data signal.

17. The latch circuit of claim 14, including:
   a first flip-flop with a clocking input for receiving the clock signal, a reset input connected to receive a strobe signal, and a data input connected to a predetermined logic state;
   a second flip-flop with a clocking input connected to an output of the first flip-flop, a reset input connected to receive a reset signal, and a data input connected to receive data derived from a frequency command data signal; and
   a third flip-flop with a clocking input connected to the strobe signal, a reset input connected to receive the reset signal, and a data input connected to an output of the second flip-flop; and,
   an output of the third flip-flop for providing the band select signal.

18. The latch circuit of claim 17, wherein the output of the first flip-flop provides a latch signal for latching a frequency data word derived from the frequency command data signal.

19. A system for facilitating band switching in a communication apparatus, the apparatus comprising:
   an input/output (i/o) section including an input node;
   a receiver connected to the i/o section;
   a transmitter connected to the i/o section; and
   a frequency synthesizer connected to the transmitter and receiver;
   a circuit connected to an output of the receiver and connected to band-specific circuitry, wherein the circuit is responsive to at least one data bit of a frequency command data signal received at the input node and a clock signal and a control signal, the circuit thereby outputting a band select signal to select and enable the band-specific circuitry within the communication apparatus.

20. The system of claim 19, further including a controller connected to the receiver for 1) evaluating the data of the frequency command data signal, and based thereon, control the operation of the frequency synthesizer, and 2) generating the clock signal and the control signal to be used by the circuit.

21. The system of claim 20, wherein the controller further includes a digital signal processor for evaluating the frequency command data signal.

22. The system of claim 20, wherein the controller further includes a microprocessor for evaluating the frequency command data signal.

23. The system of claim 20, wherein the controller provides a signal for latching data of the frequency command data signal and the data thereafter used to define the operating state of the communication apparatus.

24. A communication apparatus comprising a selector, a second section, a third section and controller, and wherein the communication apparatus is capable of at least dual mode operating ability, and wherein state specific circuitry within the second section and state specific circuitry within the third section are both responsive to a pre-determination of a command signal;
   the controller, in a first evaluation of the command signal provided by the selector, uses a specific subset of operable code to predetermine only a portion of the second operating state of the communication apparatus, and in a second evaluation of the command signal, uses additional operable code to determine the second operating state of the communication apparatus;
   a first signal path from the controller to the state specific operating circuitry within the second section for generating a control signal to activate the state specific circuitry therein based on the predetermined portion of the second operating state; and
   a second signal path to the state specific operating circuitry within the third section wherein a deselecting signal to deactivate the state specific circuitry therein based on the predetermined portion of the second operating state;
   a plurality of signal paths connected from the controller and to a plurality of control circuits, wherein each control circuit is used to implement the second state as subsequently determined.

25. The communication apparatus of claim 24, wherein the controller includes a microprocessor used for determining the second state.

26. The communication apparatus of claim 24, wherein the controller includes a digital signal processor used for determining the second state.

27. The communication apparatus of claim 26, wherein the digital signal processor processes the operable code in cooperation with a microprocessor.

28. The communication apparatus of claim 24, wherein the controller includes an application specific integrated circuit (ASIC) including a logic circuit which connects to the signal path from the controller.

29. A method for providing operational control in a communication apparatus with at lea two states of operation, the communication apparatus including a first operational section, a second operational section, and a controller, the method comprising:
   operating the communications apparatus in a first operating state;
   receiving an operational command signal, the operational command signal including an operational data word used in specifying an operating state of the communication apparatus and at least one functional bit used in defining at least a portion of the operating state;
   extracting the functional bit from the operational command signal to thereby generate at least one operational mode signal;
   providing the operational mode signal or signals to the first operational section to modify operation thereof; and, thereafter,
   determining from the operational data word data which specifies a second operating state; and,
   controlling the first operational section and the second operational section from the controller and in conformity with the data which specified the second operating state.

30. The method of claim 29, wherein the step of determining includes processing the operational command signal by a digital signal processor to establish the data of the operational data word.

31. The method of claim 29, wherein the step of determining includes processing the operational command signal by a microprocessor to establish the data of the operational data word.

32. The method of claim 29, wherein the first operational section includes a portion of a receiver section of the communication apparatus.

33. The method of claim 29, wherein the first operational section includes a portion of a transmitter section of the communication apparatus.

34. The method of claim 29, wherein the first operational section includes a portion of a switching section of the communication apparatus.

35. The method of claim 29, wherein the second operational section includes a portion of a frequency synthesizer section of the communication apparatus.

36. The method of claim 29, wherein the second operational section includes a portion of a transmitter section of the communication apparatus.

37. The method of claim 29, wherein the second operational section includes a portion of a receiver section of the communication apparatus.

38. The method of claim 29, wherein the step of extracting includes holding the functional bit in a latch for at least the time the controller utilizes for evaluating the operational data word and for implementing the operational state defined by the functional bit.

39. The method of claim 29, wherein the step of extracting includes holding the functional bit in a latch for at least the time the controller utilizes for evaluating the operational data word and for implementing the operational state defined by the data of the operational data word.

40. The method of claim 29, wherein the step of coupling includes coupling the controller to a digital signal processor programmed with a set of computer instructions for controlling operation of the communication apparatus.

41. The method of claim 29, wherein the step of coupling includes coupling the controller to a logic circuit for controlling operation of the communication apparatus.

42. The method of claim 41, wherein the logic circuit includes a portion of an application specific integrated circuit (ASIC).

* * * * *